(12) United States Patent
Bjones et al.

(10) Patent No.: US 9,444,817 B2
(45) Date of Patent: Sep. 13, 2016

(54) FACILITATING CLAIM USE BY SERVICE PROVIDERS

(71) Applicant: Microsoft Corporation, Redmond, WA (US)

(72) Inventors: Ronald John Kamiel Euphrasia Bjones, Dilbeek (BE); Kim Cameron, Bellevue, WA (US); Anthony Joseph Nadalin, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/628,044

(22) Filed: Sep. 27, 2012

(65) Prior Publication Data
US 2014/0090088 A1    Mar. 27, 2014

(51) Int. Cl.
*H04L 29/06* (2006.01)
*G06F 21/41* (2013.01)
*G06F 21/44* (2013.01)

(52) U.S. Cl.
CPC ............. *H04L 63/10* (2013.01); *G06F 21/41* (2013.01); *G06F 21/44* (2013.01); *H04L 63/0815* (2013.01)

(58) Field of Classification Search
CPC . H04L 63/0815; H04L 63/10; H04L 63/102; G06F 21/41; G06F 21/44
USPC ...................................................... 726/8, 29
See application file for complete search history.

(56) References Cited

U.S. PATENT DOCUMENTS

| | | |
|---|---|---|
| 5,815,665 A | 9/1998 | Teper et al. |
| 7,146,435 B2 | 12/2006 | Williams |
| 7,536,184 B2 | 5/2009 | Poczo |
| 7,610,390 B2 | 10/2009 | Yared et al. |
| 7,788,729 B2 | 8/2010 | Cameron et al. |
| 7,849,204 B2 | 12/2010 | Yared et al. |
| 7,979,899 B2 | 7/2011 | Guo et al. |
| 8,037,194 B2 | 10/2011 | Yared et al. |
| 8,073,783 B2 | 12/2011 | Felsted |
| 8,074,258 B2 | 12/2011 | Nanda et al. |
| 8,112,405 B2 | 2/2012 | Shiloh |
| 8,132,239 B2 | 3/2012 | Wahl |
| 8,190,884 B2 | 5/2012 | Alroy et al. |

(Continued)

OTHER PUBLICATIONS

"OIX Open Identity Exchange: Trust Framework Requirements and Guidelines V1 (Draft 01)" Published Jan. 17, 2011 (7 pages) http://openidentityexchange.org/sites/default/files/OIX%20Trust%20Framework20%Requirements.pdf.*

(Continued)

*Primary Examiner* — Joseph P Hirl
*Assistant Examiner* — Thomas Gyorfi
(74) *Attorney, Agent, or Firm* — Aneesh Mehta; Kate Drakos; Micky Minhas

(57) ABSTRACT

Aspects of the subject matter described herein relate to facilitating claim use in an identity framework. In aspects, a definition of a trust framework may be received and stored. A graphical interface may display a plurality of trust frameworks and allow an administrator to select which trust framework to instantiate. The graphical interface may also allow the administrator to define which rules of the trust framework to use in the instance of the trust framework. After receiving this information, the instance of the trust framework may be instantiated and configuration data provided to the administrator to allow the administrator to configure a Web service to invoke the instance of the trust framework to grant or deny access to the Web service.

18 Claims, 11 Drawing Sheets

(56) References Cited

U.S. PATENT DOCUMENTS

| | | | |
|---|---|---|---|
| 8,392,469 | B2 | 3/2013 | Khan et al. |
| 8,505,085 | B2 | 8/2013 | Logan |
| 8,661,519 | B2 | 2/2014 | Kron |
| 8,666,904 | B2 | 3/2014 | Pravetz |
| 8,973,099 | B2 | 3/2015 | Reeves, Jr. et al. |
| 2003/0080997 | A1 | 5/2003 | Fuehren |
| 2003/0149781 | A1 | 8/2003 | Yared et al. |
| 2006/0058046 | A1 | 3/2006 | Matsuura |
| 2007/0156766 | A1* | 7/2007 | Hoang et al. ............ 707/200 |
| 2007/0184830 | A1 | 8/2007 | Sullivan et al. |
| 2007/0204168 | A1 | 8/2007 | Cameron et al. |
| 2007/0234408 | A1 | 10/2007 | Burch et al. |
| 2008/0014931 | A1 | 1/2008 | Yared et al. |
| 2008/0016232 | A1 | 1/2008 | Yared et al. |
| 2008/0028453 | A1* | 1/2008 | Nguyen et al. ............ 726/9 |
| 2008/0097822 | A1 | 4/2008 | Schigel |
| 2008/0222714 | A1 | 9/2008 | Wahl |
| 2008/0235513 | A1 | 9/2008 | Foster et al. |
| 2008/0320576 | A1 | 12/2008 | Curling |
| 2009/0132813 | A1 | 5/2009 | Schibuk |
| 2009/0271856 | A1 | 10/2009 | Doman |
| 2009/0282260 | A1 | 11/2009 | Tattan et al. |
| 2009/0313266 | A1 | 12/2009 | Khan et al. |
| 2009/0320103 | A1 | 12/2009 | Veeraraghavan et al. |
| 2010/0043062 | A1 | 2/2010 | Alexander |
| 2010/0077450 | A1 | 3/2010 | Hudis et al. |
| 2010/0100926 | A1* | 4/2010 | Binding .......... G06F 21/41 726/1 |
| 2010/0132019 | A1 | 5/2010 | Hardt |
| 2010/0165213 | A1 | 7/2010 | Knutson |
| 2010/0214976 | A1 | 8/2010 | Libes et al. |
| 2010/0254489 | A1 | 10/2010 | Citta |
| 2010/0299738 | A1 | 11/2010 | Wahl |
| 2010/0318806 | A1 | 12/2010 | Hardt |
| 2010/0325441 | A1 | 12/2010 | Laurie et al. |
| 2010/0325723 | A1 | 12/2010 | Essawi et al. |
| 2011/0010762 | A1* | 1/2011 | Nijdam et al. ............ 726/5 |
| 2011/0078000 | A1 | 3/2011 | Ma |
| 2011/0126010 | A1 | 5/2011 | Kim et al. |
| 2011/0145593 | A1 | 6/2011 | Auradkar |
| 2011/0202982 | A1 | 8/2011 | Alexander |
| 2011/0202991 | A1 | 8/2011 | Paquin et al. |
| 2011/0231919 | A1* | 9/2011 | Vangpat et al. ............ 726/8 |
| 2011/0307938 | A1 | 12/2011 | Reeves, Jr. et al. |
| 2012/0265633 | A1 | 10/2012 | Wohlstadter |
| 2012/0311689 | A1 | 12/2012 | Kron |
| 2013/0103529 | A1 | 4/2013 | Loveman et al. |
| 2013/0125197 | A1 | 5/2013 | Pravetz et al. |

OTHER PUBLICATIONS

"OIX Open Identity Exchange: An Open Market Solution for Online Identity Assurance" Published Mar. 2010 (13 pages) http://openidentityexchange.org/sites/default/files/oix-white-paper-2010-03-02.pdf.*

"Criterion White Paper: Federated Online Attribute Exchange Initiatives" Published Jun. 14, 2012 (7 pages) http://openidentityexchange.org/sites/default/files/Federated Online Attribute Exchange White Paper 6.pdf.*

"OIX: The OIX Listing Service" ©2010 OIX [Article dated Mar. 12, 2011 as seen by Internet Archive] (2 pages) http://web.archive.org/web/20110312105303/http://openidentityexchange.org/listing-service.*

"OIX Open Identity Exchange Trust Framework Provider Assessment Package" US ICAM LOA 1 V2, Published Nov. 8, 2011 (28 pages) http://www.gakunin.jp/jo0igwggg-308/?action=common_download_main&upload_id=286.*

"ICAM Federal Identity, Credentialing, and Access Management Identity Metasystem Interoperability 1.0 Profile" Version 1.0.1 Release Candidate, Nov. 18, 2009 (pp. 1-21) http://web.archive.org/web/20120510092810/http://www.idmanagement.gov/documents/ICAM_IMI_10_Profile.pdf.*

OIX: Creating a New Trust Framework. 02010 Open Identity Exchange (2 pages) http://web.archive.org/web/20110727152911/http://openidentityexchange.org/creating-a-new-trust-framework.*

"The telecommunications world is experiencing disruptive changes in business models and revenue sources as a result of ongoing industry consolidation and the approaching convergence of Telecom, Media and Web networks", Retrieved at <<http://www.amsoft.net/markets/telecom.htm>>, Retrieved Date: Oct. 19, 2012, p. 1.

Leung, et al., "Ninja: Non Identity Based, Privacy Preserving Authentication for Ubiquitous Environments", Retrieved at <<http://www.isg.rhul.ac.uk/cjm/nnibpp.pdf>>, UbiComp '07 Proceedings of the 9th international conference on Ubiquitous computing, Sep. 16, 2007, pp. 73-90.

Rial, et al., "Privacy-Preserving Smart Metering", Retrieved at <<http://research.microsoft.com/en-us/um/people/gdane/pfsm.pdf.pdf>>, WPES '11 Proceedings of the 10th annual ACM workshop on Privacy in the electronic society, Oct. 17, 2011, pp. 49-60.

Zhu, et al., "PPAB: A Privacy-Preserving Authentication and Billing Architecture for Metropolitan Area Sharing Networks", Retrieved at <<http://ieeexplore.ieee.org/stamp/stamp.jsp?tp=&arnumber=4657374>>, IEEE Transactions on Vehicular Technology, Jun. 2009, pp. 2529-2543.

Martinet, et al., "Cryptanalysis of a partially blind signature scheme or how to make $100 bills with $1 and $2", Retrieved at <<http://www.ssi.gouv.fr/archive/fr/sciences/fichiers/lcr/maposo06.pdf>>, FC'06 Proceedings of the 10th international conference on Financial Cryptography and Data Security, Feb. 27, 2006, pp. 171-176.

"Making sense of the National Strategy for Trusted Identities in Cyberspace (Part IV: Strawman Architecture)", Retrieved at <<http://www.educatedguesswork.org/2011/05/making_sense_of_the_national_s_3.html>>, May 25, 2011, pp. 2.

Molina-Markham, et al., "Designing Privacy-preserving Smart Meters with Low-cost Microcontrollers", Retrieved at <<http://fc12.ifca.ai/pre-proceedings/paper_29.pdf>>IACR Cryptology ePrint Archive, Retrieved Date: May 16, 2012, pp. 15.

Tiwari, et al., "A Multi-Factor Security Protocol for Wireless Payment—Secure Web Authentication Using Mobile Devices", Retrieved at <<http://www.tifr.res.in/~sanyal/papers/Ayu_MultiFactorSecurityProtocol.pdf>>, IADIS International Conference Applied Computing 2007, Feb. 2007, pp. 160-167.

Chou, David, "Strong User Authentication on the Web", Retrieved at <<http://msdn.microsoft.com/en-us/library/cc838351.aspx>>, Aug. 2008, pp. 10.

Bertocci, Vittorio, "Claims and Identity: On-Premise and Cloud Solutions", Retrieved at <<http://msdn.microsoft.com/en-us/library/cc836390.aspx>>, Jul. 2008, pp. 15.

Geest, et al., "Managing Identity Trust for Access Control", Retrieved at <<http://msdn.microsoft.com/en-us/library/cc836395.aspx>>, Jul. 2008, pp. 10.

Slamanig, Daniel., "More Privacy for Cloud Users: Privacy-Preserving Resource Usage in the Cloud", Retrieved at <<http://petsymposium.org/2011/papers/hotpets11-final2Slamanig.pdf>>, 4th Hot Topics in Privacy Enhancing Technologies (HotPETs 2011), Jul. 27, 2011, pp. 13.

Tian, et al., "Privacy Preserving Personalized Access Control Service at Third Service Provider", Retrieved at <<http://ieeexplore.ieee.org/stamp/stamp.jsp?tp=&arnumber=6009456>>, 2011 IEEE International Conference on Web Services, Jul. 4, 2011, pp. 694-695.

U.S. Appl. No. 13/682,743, filed Nov. 21, 2012, 66 pages.
U.S. Appl. No. 13/652,478, filed Oct. 16, 2012, 73 pages.
U.S. Appl. No. 13/655,436, filed Oct. 18, 2012, 74 pages.
U.S. Appl. No. 13/705,179, filed Dec. 5, 2012, 75 pages.
U.S. Appl. No. 13/688,210, filed Nov. 29, 2012, 75 pages.

Bjones, et al., "Architecture Serving Complex Identity Infrastructures", Retrieved at <<http://www.trustindigitallife.eu/uploads/Architecture%20serving%20complex%20Identity%20Infrastructures.pdf>>, Feb. 2012, pp. 21.

"Claims-Based Single Sign-On for the Web and Windows Azure", Retrieved at <<http://msdn.microsoft.com/en-us/library/ff359102.aspx>>, Feb. 3, 2010, pp. 24.

(56) References Cited

OTHER PUBLICATIONS

Rundle, et al., "The Open Identity Trust Framework (OITF) Model", Retrieved at <<http://openidentityexchange.org/sites/default/files/the-open-identity-trust-framework-model-2010-03.pdf>>, Mar. 2010, pp. 16.
"The Telcom Data Trust Framework", Retrieved at <<http://openidentityexchange.org/trust-frameworks/telcom-data>>, Retrieved Date: May 9, 2012, pp. 4.
U.S. Appl. No. 13/688,210, Office Action dated May 14, 2014, 12 pages.
Chappell, "Introducing windows CardSpace", Apr. 2006, 15 pages.
"What InfoCard Is and Isn't", May 2006, 4 pages.
Bhargava et al., "Verified Implementations of the Information Card Federated Identity-Management Protocol", 2008, 13 pages.
Hoang, "Secure Roaming with Identity Metasystems", 2007, 12 pages.
Friedman, et al., "Online Identity and Consumer Trust: Assessing Online Risk", Jan. 11, 2011, 17 pages.
"Microsoft's vision for an Identity Metasystem", 2005, 10 pages.
Nanda, "Identity selector interoperability profile V1.0", 2007, 52 pages.
Chadwick, "Federated Identity Management", 2009, 25 pages.
Cameron, et al., "Design Rationale behind the Identity Metasystem Architecture", 2007, 13 pages.
"A Guide to using the identity Selector interoperability profile V1.0 within web applications and browsers", Apr. 2007, 14 pages.
U.S. Appl. No. 13/705,179, Notice of Allowance mailed Apr. 8, 2014, 9 pages.
U.S. Appl. No. 13/688,10, Office Action dated May 14, 2014, 12 pages.
U.S. Statutory Invention Registration U.S. H1944 H, Cheswick, Feb. 6, 2001, 12 pages.
U.S. Appl. No. 13/655,436, Office Action mailed Jan. 31, 2014, 10 pages.
U.S. Appl. No. 13/682,743, Notice of Allowance mailed Feb. 19, 2014, 7 pages.
U.S. Appl. No. 13/652,478, Office Action dated Aug. 28, 2014, 14 pages.
U.S. Appl. No. 13/655,436, Amendment dated Jul. 29, 2014, 13 pages.
U.S. Appl. No. 13/655,436, Notice of Allowance dated Nov. 7, 2014, 10 pages.
U.S. Appl. No. 13/652,478, Amendment dated Dec. 29, 2014, 14 pages.
U.S. Appl. No. 13/688,210, Amendment dated Nov. 14, 2014, 14 pages.
U.S. Appl. No. 13/688,210, Final Office Action dated Feb. 11, 2015, 13 pages.
U.S. Appl. No. 13/652,478, Final Office Action dated Jan. 15, 2015, 18 pages.
U.S. Appl. No. 13/652,478, Amendment filed Mar. 31, 2015, 16 pages.
U.S. Appl. No. 13/688,210, Amendment dated Apr. 29, 2015, 14 pages.
U.S. Appl. No. 13/652,478, Non-Final Rejection dated Jul. 6, 2015, 19 pages.
U.S. Appl. No. 13/688,210, Non-Final Rejection dated Jun. 18, 2015, 18 pages.
U.S. Appl. No. 13/688,210, Amendment dated Sep. 8, 2015, 14 pages.
U.S. Appl. No. 13/652,478, Amendment dated Sep. 23, 2015, 20 pages.
U.S. Appl. No. 13/688,210, Final Rejection dated Oct. 28, 2015, 18 pages.
U.S. Appl. No. 13/652,478, Final Office Action dated Jan. 6, 2016, 16 pages.
U.S. Appl. No. 13/688,210, Amendment dated Jan. 12, 2016, 15 pages.
U.S. Appl. No. 13/688,210, Office Action dated Feb. 12, 2016, 17 pages.
U.S. Appl. No. 13/688,210, Amendment dated Apr. 25, 2016, 16 pages.
U.S. Appl. No. 13/652,478, Amendment dated Apr. 4, 2016, 18 pages.

* cited by examiner

*FIG. 5*

STEP 4: IDENTITY PROVIDERS

SELECT IDENTITY PROVIDERS

▽ FACEBOOK
  ☐ PROVIDER
  ☐ PRIVACYID
  ☐ ACCOUNTNAME
  ☐ NAME

△ GOOGLE

△ LINKEDIN

△ TWITTER

△ WINDOWSLIVE

△ YAHOO

[ NEXT ]

500

FACILITATING CLAIM USE BY SERVICE PROVIDERS

BACKGROUND

For many individuals, there is a great concern that their activities with entities on the Web may be tracked and linked to them. With sufficient identifying information, a criminal entity may be able to fake an identity and use it in harmful ways. Companies have tried to address this issue by developing various secure systems. Unfortunately, such systems are often too cumbersome or non-intuitive for users. Furthermore, the cost and complexity of setting up a secure and trusted system are barriers for many companies and other entities.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to facilitating claim use in an identity framework. In aspects, a definition of a trust framework may be received and stored. A graphical interface may display a plurality of trust frameworks and allow an administrator to select which trust framework to instantiate. The graphical portal may also allow the administrator to define which rules of the trust framework to use in the instance of the trust framework. After receiving this information, the instance of the trust framework may be instantiated and configuration data provided to the administrator to allow the administrator to configure a Web service to invoke the instance of the trust framework to grant or deny access to the Web service.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIGS. 2-6 are block diagrams of exemplary user interface windows of a wizard in accordance with aspects of the subject matter described herein;

DETAILED DESCRIPTION

Definitions

Figure 1:
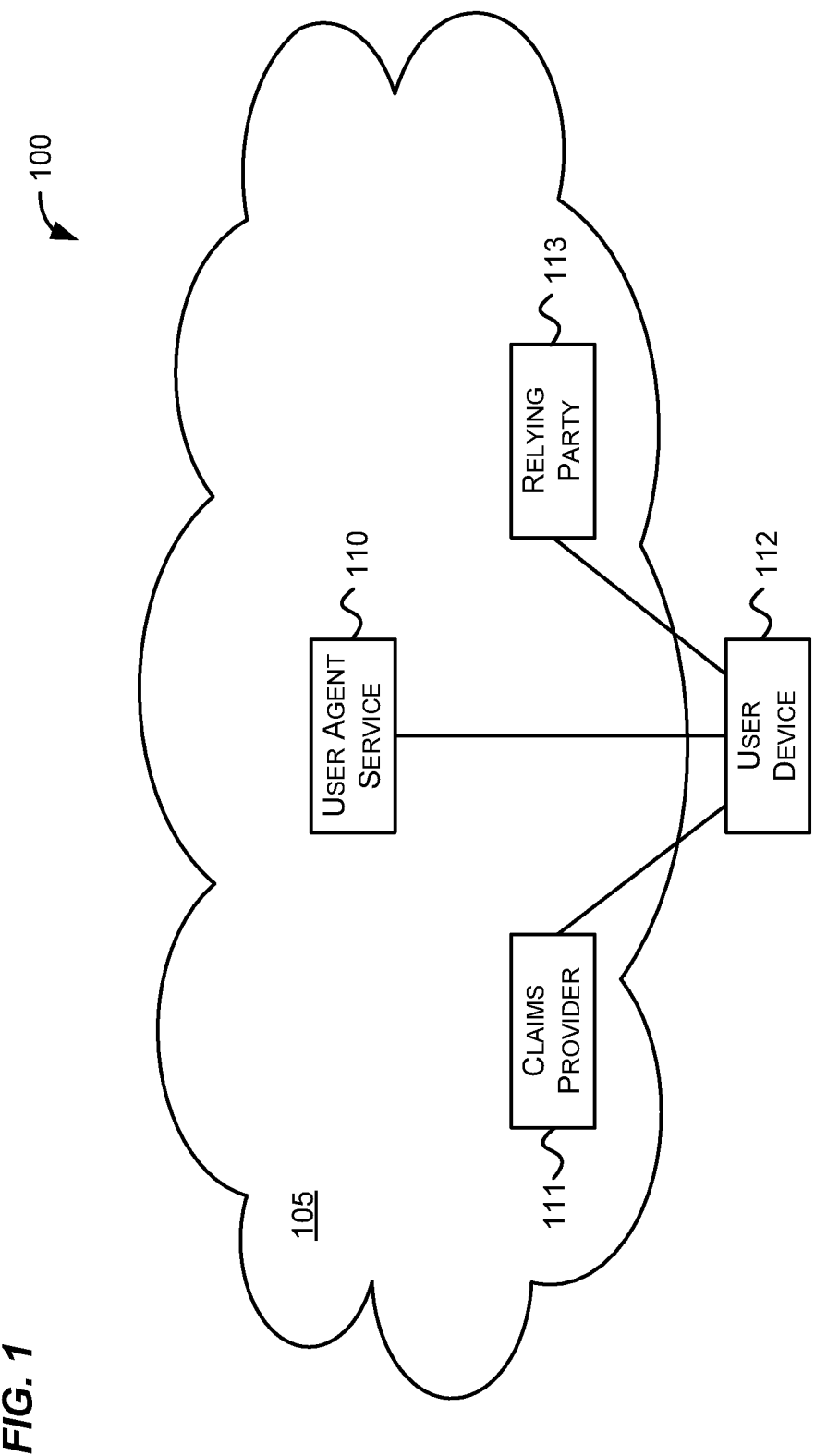
FIG. 1 is a block diagram that represents an exemplary environment in which aspects of the subject matter described herein may operate.

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Embodiments

As mentioned previously, privacy on the Web is a sensitive issue. Some of the figures herein illustrate components. The components illustrate herein are exemplary and are not meant to be all-inclusive of components that may be needed or included. In other embodiments, the components and/or services described herein may be included in other components (shown or not shown) or placed in sub components without departing from the spirit or scope of aspects of the subject matter described herein. In some embodiments, the components and/or services described herein.

One or more of the components herein may be implemented by one or more computing devices. Computing devices may include one or more personal computers, server computers, hand-held or laptop devices, multiprocessor systems, microcontroller-based systems, set-top boxes, programmable and non-programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

Where a line connects one component to another or where two components are found in the same figure, it is to be understood that the two components may be connected (e.g., logically, physically, virtual, or otherwise) via any type of network including a direct connection, a local network, a non-local network, the Internet, some combination of the above, and the like. For example, a line may represent one or more local area networks, wide area networks, direct connections, virtual connections, private networks, virtual private networks, some combination of the above, and the like.

One or more of the components described herein may be implemented in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

More than one virtual machine may be hosted on a single computer. That is, two or more virtual machines may execute on a single physical computer. To software executing in each virtual environment, the virtual environment appears to have its own resources (e.g., hardware) even though the virtual machines hosted on a single computer may physically share one or more physical devices with each other and with the hosting operating system.

FIG. 1 is a block diagram that represents an exemplary environment in which aspects of the subject matter described herein may operate. Turning to FIG. 1, the system 105 may include a claims provider 111, a user agent service 110, a user device 112, a relying party 113, and other entities (not shown). As used herein, the term entity is to be read to include all or a portion of one or more devices, a service, a collection of one or more software modules or portions thereof, some combination of one or more software modules or portions thereof and one or more devices or portions thereof, and the like.

A service may be implemented using one or more processes, threads, components, libraries, and the like that perform a designated task. A service may be implemented in hardware, software, or a combination of hardware and software. A service may be distributed over multiple devices or may be implemented on a single device.

A user may seek to access goods, services, data, resources, or other information provided by the relying party 113. The user may be a natural person or persons, a computer, a network, any other entity, or the like.

Sometimes herein, the term "services" is used to indicate something that the relying party may provide. A service may include data, resources, or other information that may be provided by the relying party 113.

Furthermore, sometimes the term "user" is used to reference the entity that is seeking to access the services of the relying party 113. It is to be understood, however, that the term user may include a natural person or persons, one or more computers, networks, other entities, combinations of two or more of the above, or the like.

Before providing access to a service, the relying party 113 may require one or more verified claims regarding the user seeking access to the service. Verified claims may be issued by one or more claims providers that the relying party 113 trusts. A claims provider may authenticate a user before providing a claim. A claims provider may "partially" sign issued claims to provide evidence that the claims provider issued the claims.

The term "partially" sign is used to indicate that a claims provider may provide data that allows the user device 112 to complete the signature of the claims. The user device 112 completes the signature by using a function or data passed to the user device 112 by the claims provider. This is done, in part, so that the claims provider cannot later collude with the relying party 113 or any other entity to identify the user for whom the claims are provided. In addition, the function or data passed to the user device 112 may be tied to claims such that it cannot be used to sign other claims.

In some examples, a relying party may be any resource, privilege, or service that requires one or more valid claims to enter, access, or use. For example, a relying party may include: a computer, a computer network, data, a database, a building, personnel, services, companies, organizations, physical locations, electronic devices, or any other type of resource.

In one embodiment, a claim is an assertion of the truth of something. For example, a claim may convey an identifier (e.g., student number, logon name, other identifier, or the like). A claim may assert that the user knows a given key (e.g., a response to a challenge, a password, or the like). Claims may convey personally identifying information such as name, address, data of birth, citizenship, and the like. A claim may assert that a user is part of a certain group. For example, a claim may indicate that a user is over 18 years old. As another example, a claim may indicate that a user is part of a group with specific permissions.

Some familiar examples of types of claims include: first name, last name, email address, street address, locality name or city, state or province, postal code, country, telephone number, social security number, date of birth, gender, personal identifier number, credit score, financial status, legal status, and the like. It will be understood, however, that the above types of claims are exemplary only and that those skilled in the art may utilize other claims without departing from the spirit or scope of aspects of the subject matter described herein.

Sometimes, a claims provider may be referred to as an identity provider in the sense that the claims provider may provide something that identifies a characteristic of the user. In some implementations, one or more claims providers may reside on a network or in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In some implementations, one or more claims providers may reside on the user device 112. For example, the user device 112 may host a health claims provider, a biometric claims provider, other claims providers, and the like. In some implementations, one or more claims providers may be part of a trust framework that a relying party trusts.

A trust framework may include or be derived from a set of technical, operational, and legal requirements and enforcement mechanisms for parties exchanging identity information. A trust framework may be enforced by a set of components in the cloud, on a private network, on a computer accessing services through the trust framework, or the like.

To help protect against deception, the claims provider 110 may obtain data from the user, the user device 112, and/or a physical device of the user. For example, the claims provider 110 may ask one or more challenge questions to which the user must respond, receive a PIN, password, or other user-known data from the user, obtain, with consent, biometric data (e.g., fingerprint, retina, DNA, or other biometric data), receive a code from a portable item (e.g., a USB key, smart card, or the like), obtain other credentials, a combination of two or more of the above, and the like.

If the claims provider 110 is satisfied that the entity requesting a claim is the user, the claims provider 110 may provide the user with data that has been signed by the claims provider 110 in such a way as to make it difficult or infeasible to change or forge the data. This data may include or be linked to one or more claims. The user device 112 may present the data to the relying party 113 to provide one or more claims. If the data includes more claims than is required by the relying party 113, the user may present just the required claims while still presenting the signature or other data that indicates that the data has not been tampered with.

A user may not want the claims provider 110 to know the relying parties with which the user is interacting. The user may also not want the relying party to know any more information about the user than is necessary for interacting with the relying party. To avoid these undesirable events, privacy boundaries may be erected. A privacy boundary ensures that certain data is not transmitted across the boundary. For example, a privacy boundary may be erected between the user and the relying party 113 and another privacy boundary may be erected between the user and the claims provider 110. While the user device 112 may have access to all data included in both boundaries, data inside one privacy boundary may not be allowed to pass to an entity outside the privacy boundary without user consent.

To avoid the claims provider 110, the relying party 113, or both from tracking the interactions of the user or otherwise gathering data about the user, certain actions may be taken. For example, in one implementation, when a user device 112 seeks to access a service or resource of a relying party, the following actions may occur:

1. The user device 112 may contact the relying party 113. For example, if the user device 112 is hosting a Web browser, a user may type an address of a relying party in an address bar of the Web browser. In response, the Web browser may send a request to the relying party 113.

2. In response to the request, the relying party 113 may redirect the user device 112 and provide a document. The document may include a reference to the user agent service 110. The document may also include a set of claims required by the relying party 113 in order for the relying party 113 to provide the requested information. The document may include a list of claims providers 110 and/or a trust framework that the relying party 113 trusts.

3. In one embodiment, the user device 112 may then use the document to request code from the user agent service 110. Sometimes the user agent service 110 may be referred to as a policy service. The code that is downloaded from the user agent service 110 is sometimes referred to as the downloaded user agent.

In another embodiment, the code is not requested from the user agent service 110. Instead, the code is already on the user device 112 having been previously downloaded. In this embodiment, the relying party 113 may redirect the user to the user agent executing on the user device 112. The relying party 113 may also provide the document to the user agent already on the user device 112.

In yet another embodiment, the user agent may execute as a service in the cloud. In this embodiment, the document from the relying party 113 may be provided to the user agent which may then drive obtaining claims to satisfy the relying party 113. In this embodiment, the downloaded user agent refers to code that runs in the cloud. The code may have been downloaded to the cloud by the user, the user's company, or another entity that the user trusts.

4. In response to the request, the user agent service 110 may provide code to the user device 112. The code may implement a protocol the user device 112 may follow to obtain signed claims from the claims provider 110 and provide these claims to the relying party 113 without revealing data that may be used to track the user device 112. The code may be executed on the user device 112 and is sometimes referred to herein as the downloaded user agent. In another embodiment, the code may be executed in the cloud and the code is not downloaded to the user device 112.

5. The downloaded user agent may evaluate the document to determine the claims required by the relying party 113. The downloaded user agent may also evaluate the document to determine what claims providers and/or trust framework the relying party 113 trusts.

6. If the claims are already stored on the user device 112 (e.g., in a cache) or on a separate device (e.g. a smart card) and the claims are such that they may be used to respond to the relying party 113, the stored claims may be presented to the relying party. For example, although the claims may be stored on the user device or attached storage device, they may be restricted such that they are not allowed to be provided to the relying party 113. For example, the claims may be restricted by time, number of disclosures to relying parties, to certain relying parties only, or the like. Claims may be stored in the form of tokens where a token may include one or more claims and an electronic signature of a claims provider.

7. In one embodiment, if any claims required by the relying party 113 are missing from the user device 112, the downloaded user agent may redirect the user to a claims provider to obtain a new set of claims from the claims provider 110. In another embodiment, for any claims that are not already stored on the user device 112 or that are stored but are not usable to respond to the relying party 113, the downloaded user agent may then interact with the claims provider 110 to obtain signed claims that may be presented to a token provider to obtain a token to provide to the relying party 113 to obtain the service. Obtaining the signed data may involve communicating with a protocol gateway and providing data that may be used to authenticate the user.

The protocol gateway may communicate with an access control service that is federated and can provide authentication across multiple companies. The access control service may communicate with one or more identity providers to obtain claims requested by the user device 112. After receiving claims, the access control service may return the claims to the protocol gateway or some other entity which may sign and return the claims to the user device 112.

Signing the data may be done in such a way that the claims provider 110 does not see the key by which the data is signed. This may be done as indicated previously by providing the user device 112 with a function or other data that allows the user device 112 to complete the signing the claims with a key of the user device 112. This may be done, for example, to avoid allowing the claims provider 110 to track the interactions of the user either by itself or even working together with the relying party 113. The claims provider 110 may provide the claims to the downloaded user agent via the document. The document may also include a reference to the user agent service 110. In browsers, including this link allows the downloaded user agent to store and maintain state obtained from the relying party and the claims provider without invoking security problems (e.g., cross-site scripting).

8. After obtaining signed claims, the downloaded user agent may provide any claims required by the relying party 113 to the relying party 113 together with proof of signature. In one implementation, the downloaded user agent may first communicate with a token issuer to create a token that may be provided to the relying party 113. This token may be created such that the token issuer is not aware of the relying party 113 to which the token will be presented. This token may also be partially signed by the token issuer with a completed signature generated by the user device 112.

9. Upon receipt of the signed claims, the relying party 113 may verify that the claims are validly signed and that the claims are sufficient for the requested service. In one implementation, the relying party 113 may validate the claims itself. In this implementation, the relying party may also have the means to decrypt the token. Alternatively, the relying party may consult a validation service to verify that the claims are validly signed. For privacy, one or more of the claims in the token may be obscured from the relying party 113 and the validation service.

10. If the claims are validly signed and sufficient for the requested service, the relying party 113 may provide the requested service to the user device 112.

Based on the teachings herein, those skilled in the art may recognize other mechanisms or procedures for accomplishing avoiding tracking the interactions of the user or otherwise gathering data about the user. These other mechanisms or procedures may also be used without departing from the spirit or scope of aspects of the subject matter described herein.

Figure 8:
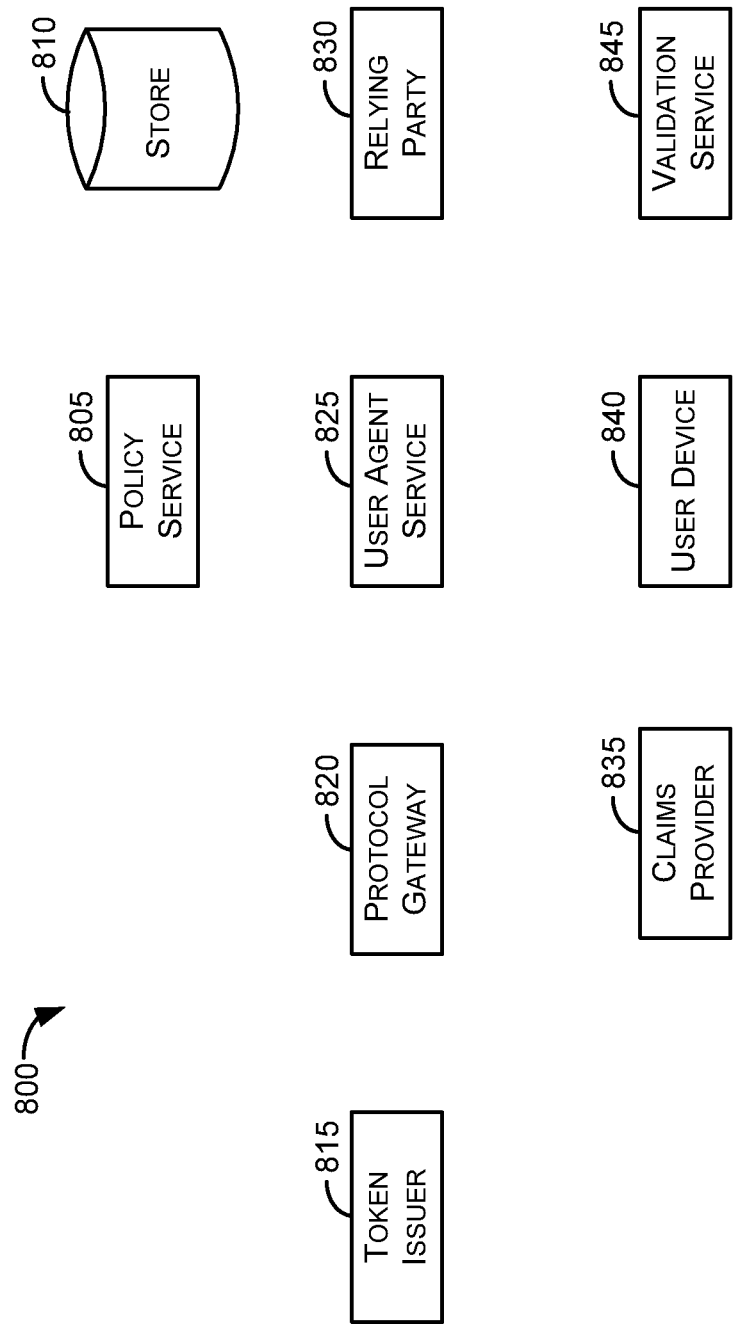
FIG. 8 is a block diagram that illustrates an exemplary system in accordance with aspects of the subject matter described herein.

FIG. 8 is a block diagram that illustrates an exemplary system in accordance with aspects of the subject matter described herein. The system 800 may include a policy service 805, a store 810, a token issuer 815, a protocol gateway 820, a user agent service 825, a relying party 830, a claims provider 835, a user device 840, a validation service 845, other components, and the like. One or more of the entities of the system 800 may be located on the same machine, the same network, or may be distributed at various places throughout the cloud.

The user agent service 825, the claims provider 835, the relying party 830, and the user device 840 may operate similarly to the user agent service 110, the claims provider 110, the relying party 113, and the user device 112, respectively, described in conjunction with FIG. 1.

The policy service 805 may provide a Web portal that an administrator may access to define rules for trust frameworks. As used herein, a Web portal may include, for example, a graphical interface that may be accessed via a network. The policy service 805 may also provide a Web portal that an administrator may access to select trust frameworks and rules to create instances of trust frameworks. Elements of an exemplary Web portal are illustrated in FIGS. 2-7.

The policy service 805 may store trust framework definitions in the store 810. The store 810 is any storage media capable of storing data. The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 810 may be implemented as a file system, database, volatile memory such as RAM, nonvolatile memory such as ROM, EEPROM, flash memory or other memory technology, CD-ROM, digital versatile discs (DVDs) or other optical disk storage, magnetic cassettes, magnetic tape, magnetic disk storage or other magnetic storage devices, flash memory cards, solid state memory devices, other storage, some combination of the above, and the like and may be distributed across multiple devices. The store 810 may be external, internal, or include components that are both internal and external to devices that host components of the system 800.

An instance of a trust framework may read its definition and policy from the store 810 to configure itself. Configuring may involve distributing components of the system 800 across one or more devices as dictated by the definition.

The token issuer 815 may create tokens as the token issuer described in conjunction with FIG. 1.

The protocol gateway 820 may operate as the protocol gateway described in conjunction with FIG. 1.

The validation service 845 may validate that claims are validly signed and that the claims are sufficient for the requested service.

Figure 2:
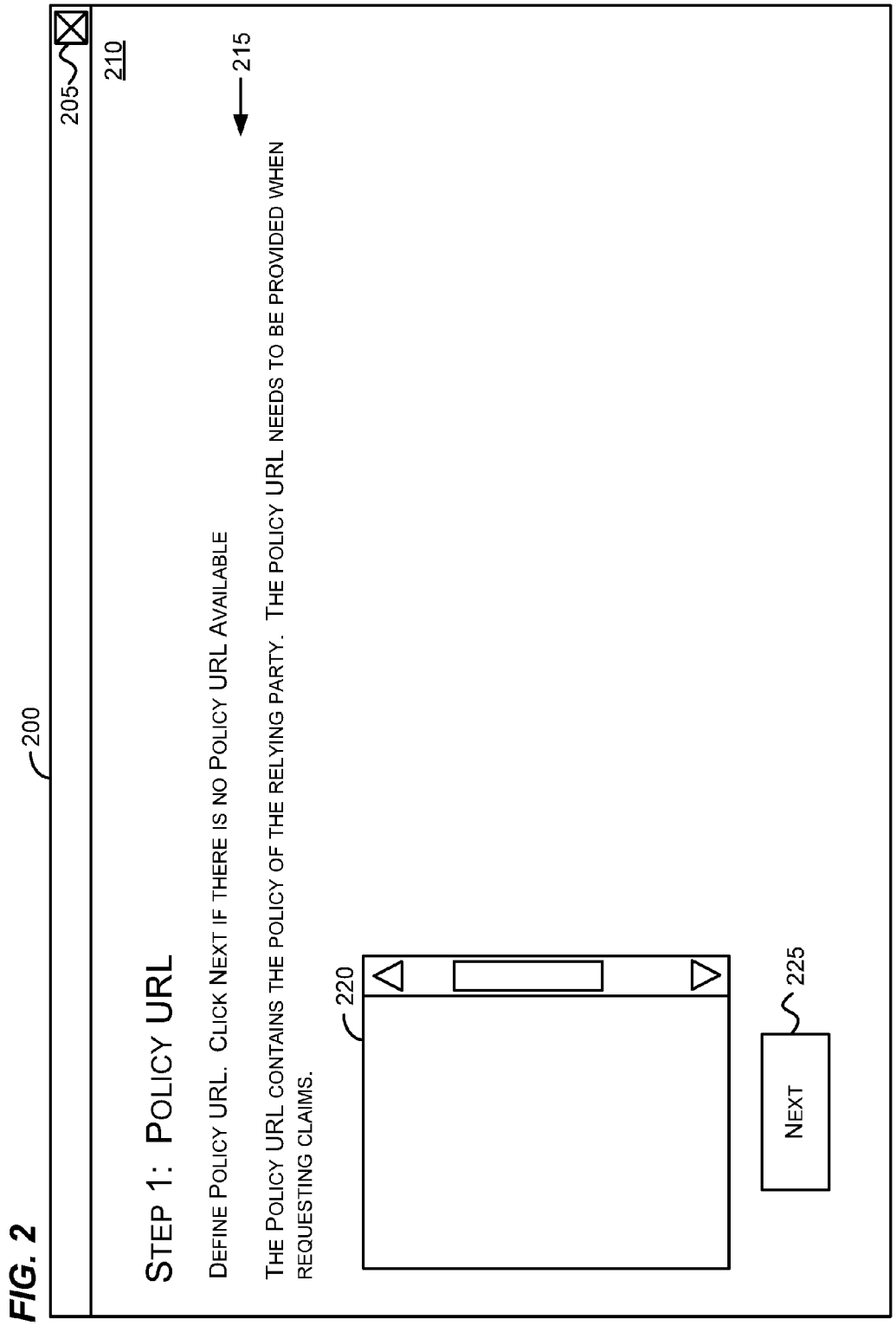

FIGS. 2-6 are block diagrams of exemplary user interface windows of a wizard in accordance with aspects of the subject matter described herein. Turning to FIG. 2, the window 200 may include a close element 205, a pane 210, and other elements, which are each elements of a user interface.

In general, an element (sometimes called a control) may be composed of zero or more other elements. For example, an element may include zero or more other elements which may include zero or more other elements and so forth. Furthermore, it will be recognized, that the window 200 may have more, fewer, or other elements which may be arranged in a variety of ways without departing from the spirit or scope of the subject matter described herein.

Furthermore, interaction with the window 200 may be performed via conventional methods, via a Natural User Interface (NUI), or the like. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

Some trust frameworks may be open to all requestors. Others may be open to only certain entities and may be closed to all other entities. This latter type of trust frameworks are sometimes referred to herein as closed frameworks. Before granting access to a closed framework, the wizard may ensure that the requestor is entitled to access to the closed trust framework. This may involve ensuring that a requestor has accepted a legal agreement, through searching a white listing to ensure that the requestor is in the white listing, or through other means without departing from the spirit or scope of aspects of the subject matter described herein.

The pane 210 may include text 215, a selection element 220, a next button 225, and/or other elements (not shown). The selection element 220 may include one or more policy URLs (Uniform Resource Locators). If the selection element 220 includes one or more policy URLs, a user interacting with the window 200 may select a policy URL using the selection element 220 and may then modify the policy URL as desired. As illustrated, the selection element 220 does not include any policy URLs and the user may activate the next button 225 to begin defining a new policy URL.

Figure 3:
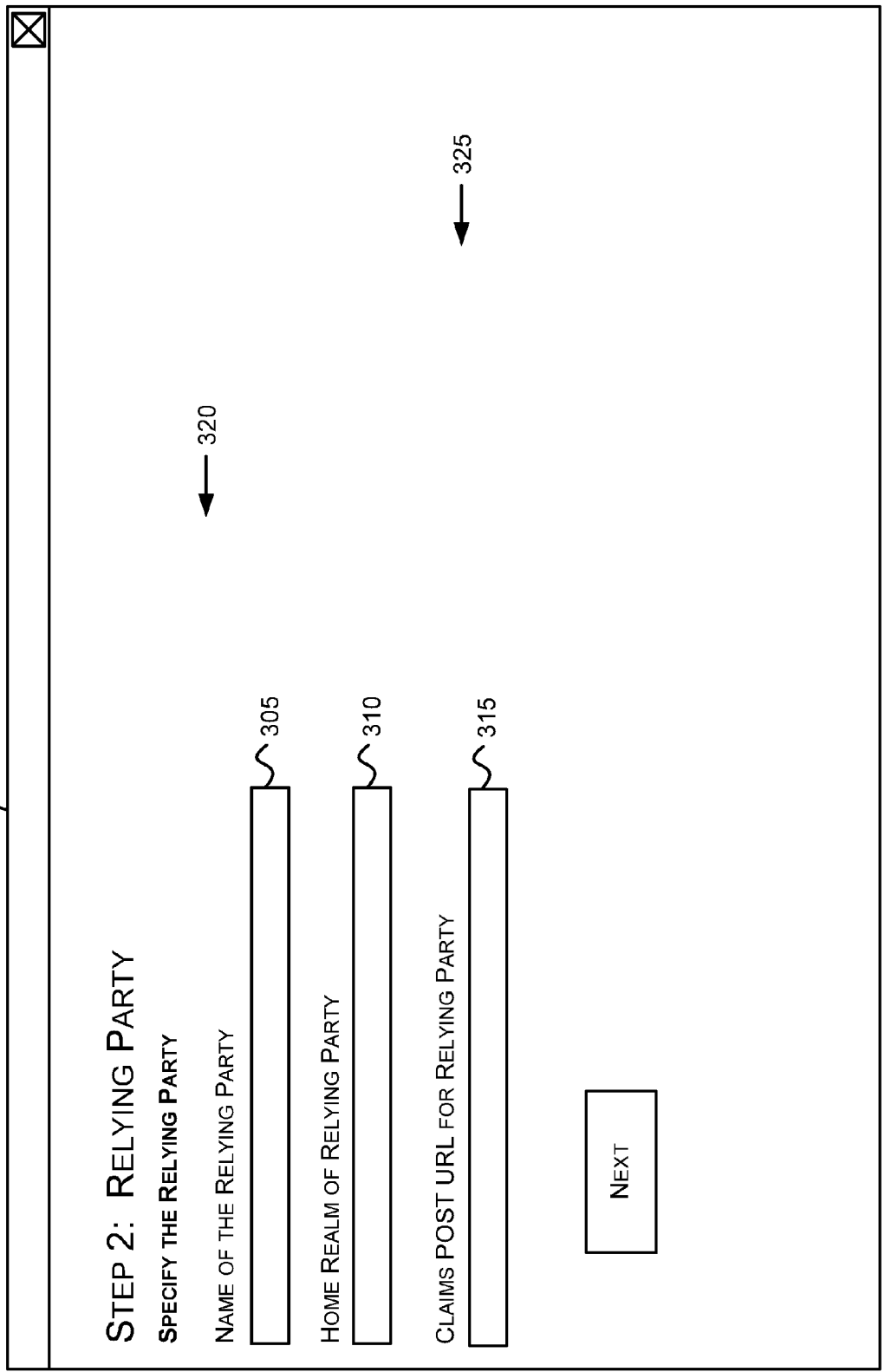

Turning to FIG. 3, the window 300 includes text and elements to specify data for the relying party. In particular the window 300 includes a text element 305 for receiving the name of the relying party, a text element 310 for receiving the home realm of the relying party, and a text element 315 for receiving a POST URL for the relying party.

The home realm is the home of the service to which access is to be controlled. The claims may be generated to ensure that they are tied to the home realm and only presentable to entities in the home realm.

The POST URL is an address to which claims may be posted by an entity of a trust framework to the relying party.

Figure 4:
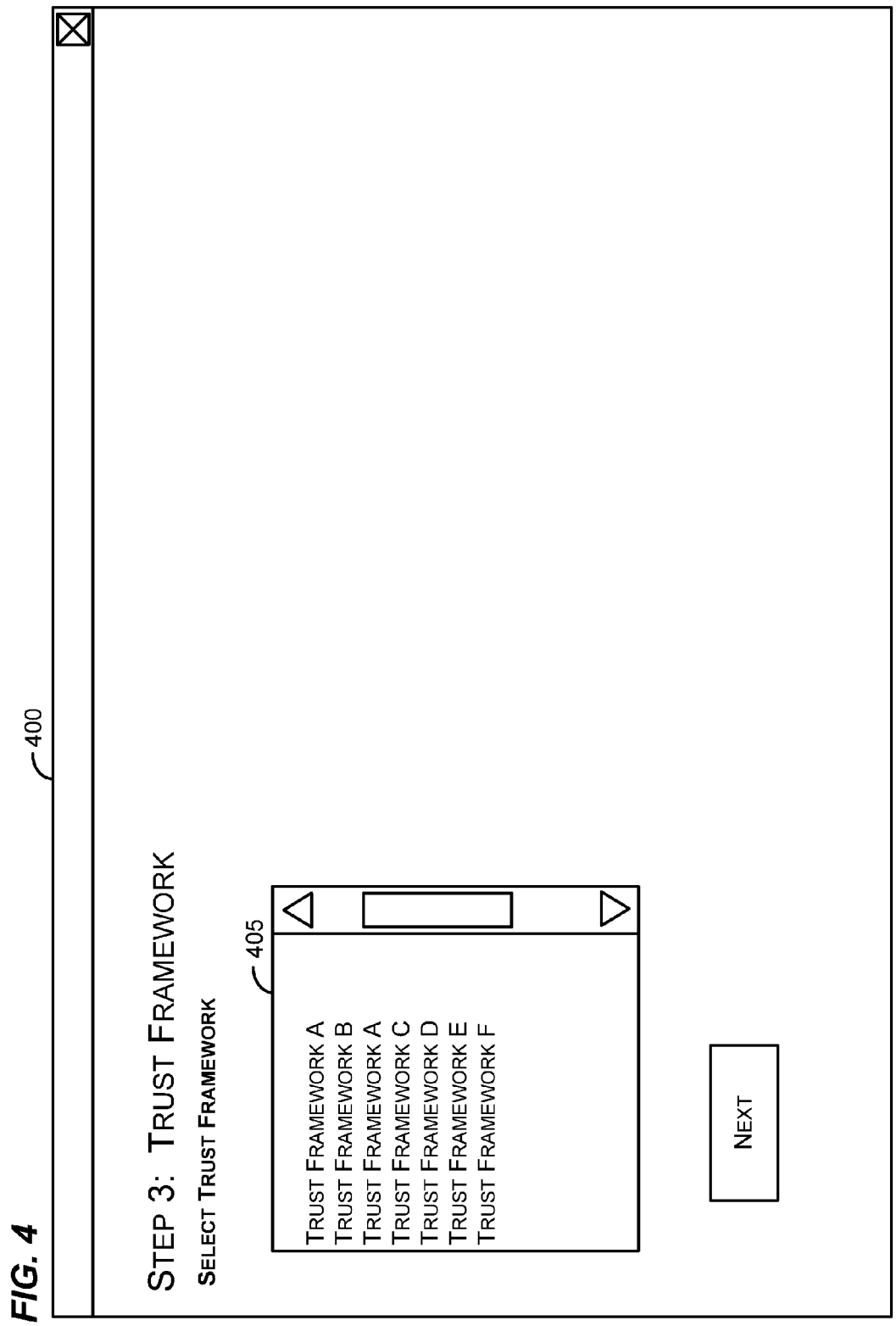

Turning to FIG. 4, a requestor may select a trust framework from the plurality of trust frameworks shown in the selection element 405. A trust framework may exist in a public cloud, a private network, or may have components that exist in the public cloud and a private network. When a trust framework is highlighted, additional information about the trust framework may be shown in the window 400.

Turning to FIG. 5, the window 500 displays one or more identity providers (also referred to herein as claims providers) that are associated with the selected trust framework. The window 500 allows a user to select identity provider(s) and claims that an entity provider is allowed to present to the relying party. An entity provider may be allowed to present the same and/or different claims from another entity provider. One or more entity providers may not be allowed to present any claims. The number of claims available from an identity provider may be the same or different from the number of claims from another entity provider.

The names of claims may be normalized (e.g., placed in a canonical form) across identity providers so that a user is presented with a naming convention that is uniform across identity providers for the claims. In addition, a user may specify the claims that are required for access to the service provided by the relying party. The user may specify an "and" relationship in which all claims specified are required or an "or" relationship in which any set of claims specified are required.

Figure 6:
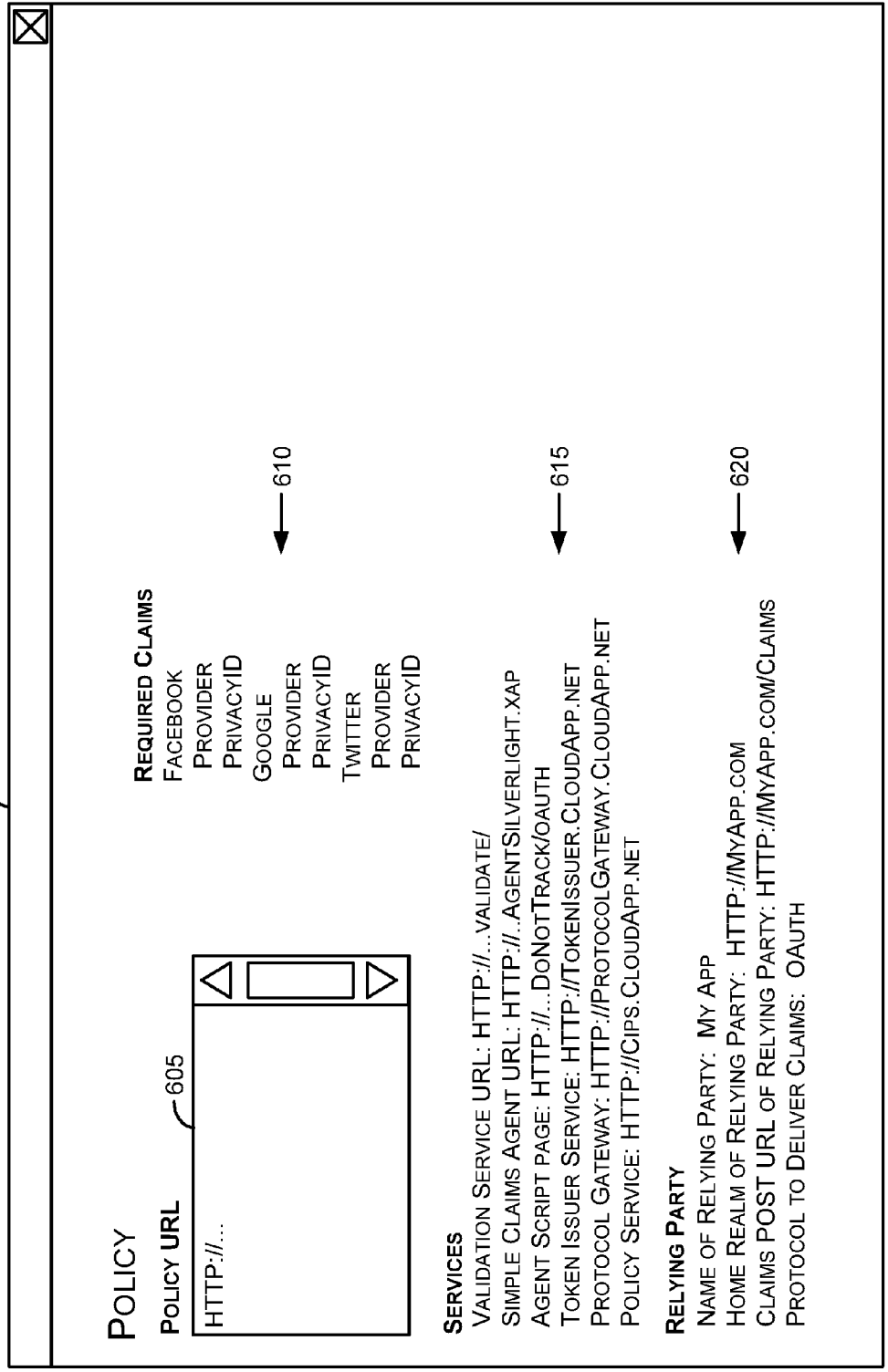

Turning to FIG. 6, the window 600 includes a policy URL together with other information. The policy URL included in the element 605 includes configuration data that indicates an entry point of an instance of a trust framework defined by the user. By placing the policy URL in the appropriate location of a Web service, for example, the Web service may redirect a request for the Web service to a component of the instance of the trust framework to determine whether the requestor is allowed access to the Web service. In one implementation, pasting the policy URL into a Web browser may cause a Web page similar to that illustrated in FIG. 7 to be displayed.

The required claims section 610 indicates claims providers that are allowed to provide claims for the relying party. The required claims section 610 also indicates which claims each claims provider is allowed to provide.

The services section 615 indicates addresses of components of the instance of the trust framework defined by the user.

The relying party section 620 indicates information about the relying party.

Figure 7:
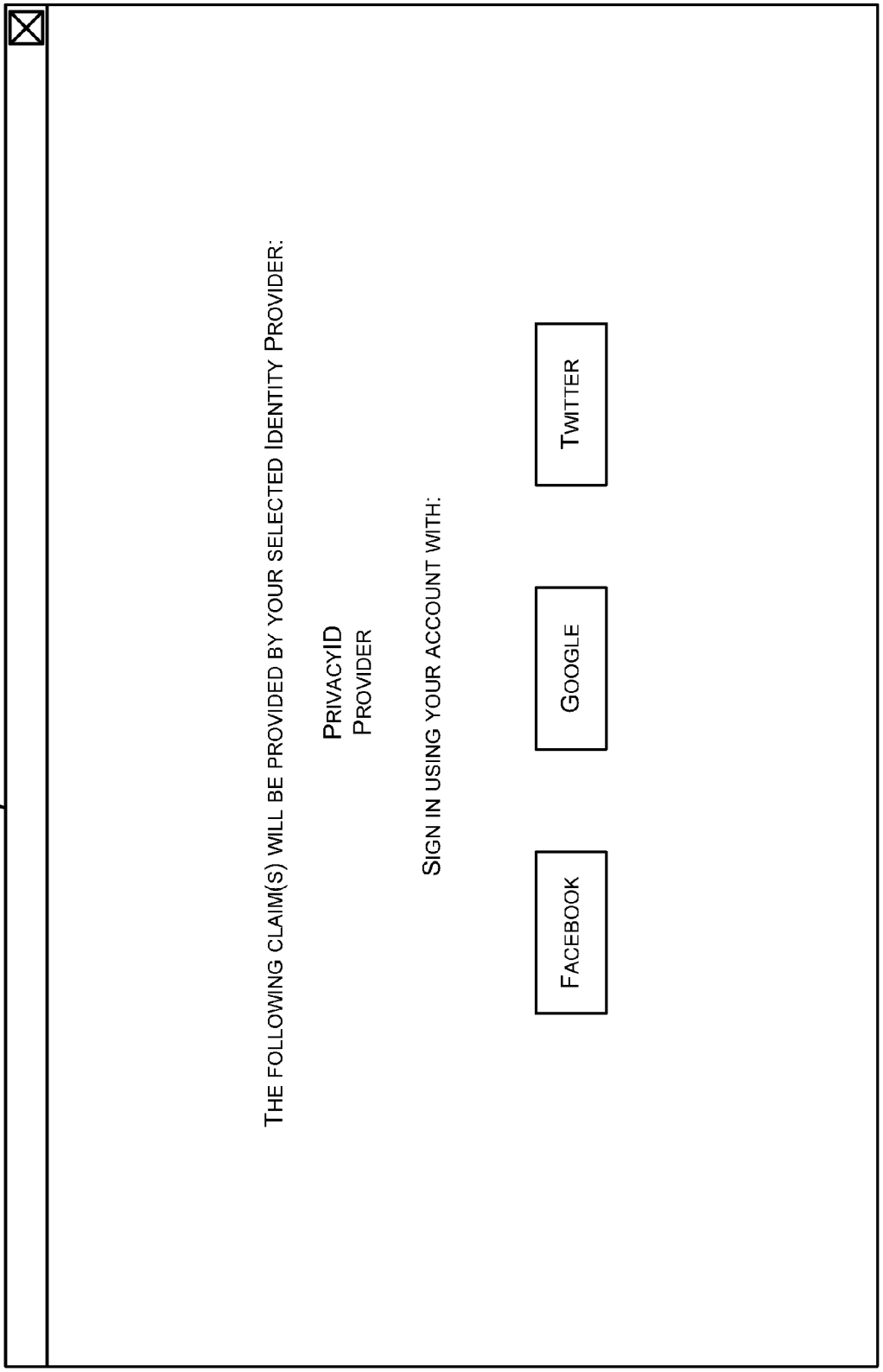
FIG. 7 is a block diagram of an exemplary user interface window used to access a service in accordance with aspects of the subject matter described herein.

FIG. 7 is a block diagram of an exemplary user interface window used to access a service in accordance with aspects of the subject matter described herein. By using the policy URL displayed in element 605 of FIG. 6, when a user attempts to access a service of the relying party, the user may be referred to a component of the trust framework that displays the information found in the window 700 and allows the user to obtain claims from the indicated claims providers. By selecting one of the claims provider buttons, the user may be taken to a login screen of the selected claims provider.

In one implementation, the information provided in the window 700 is automatically generated by the trust framework and is solely dependent on information provided earlier. In another implementation, the relying party may customize what is displayed in the window 700.

Figure 9:
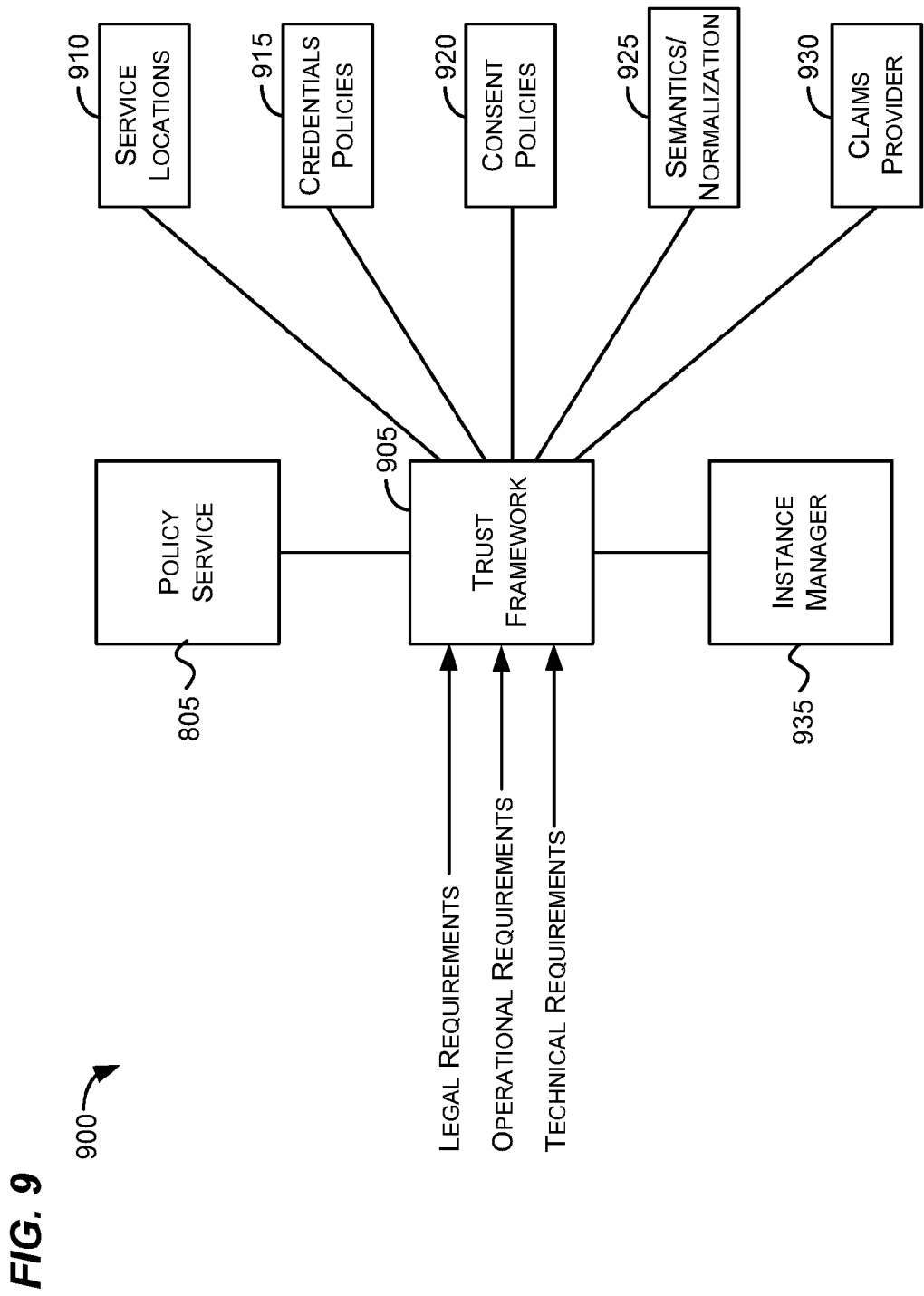
FIG. 9 is a block diagram that illustrates concepts associated with a trust framework in accordance with aspects of the subject matter described herein.

FIG. 9 is a block diagram that illustrates concepts associated with a trust framework in accordance with aspects of the subject matter described herein. The system 900 includes a trust framework 905, an instance manager 935, and a policy service 805. The trust framework 905 is defined by legal, operational, and technical requirements. The trust framework embodies service locations 910, credentials policies 915, consent policies 920, semantics/normalization 925, claims providers information 930, and the like. A definition of the trust framework 905 may be stored on a store which is represented by the block enclosing the trust framework 905.

Legal requirements may be defined by the laws and regulations of countries and other governing bodies as well as any legal requirements specified in contracts.

Operational requirements may include, for example, physical access control of the premises in which components of an instance of the trust framework are located.

Technical requirements may include any technical requirements of the trust framework.

The service locations 910 may specify where components of an instance of the trust framework may be hosted. For example, one or more components of the instance may be hosted on a private network, the cloud, or have parts on the private network and parts in the cloud.

Credentials policies 915 indicate policies regarding credentials. Credentials policies 915 may specify a credential protocol to use, if storing of credentials is allowed, how long credentials live before being invalid, and the like.

Consent policies 920 indicate policies regarding user consent regarding sharing of identity information. Consent policies 920 may be influenced, for example, by regional laws regarding consent required for sharing identity information. For example, regional laws may require asking a user for consent before performing certain types of transactions.

Semantics/normalization 925 may include information about semantics and normalization. Normalization has been described previously with respect to FIG. 5.

Claims providers information 930 includes information about claims providers. It may include information about what claims providers are allowed to provide claims for the trust framework, what claims a claims provider is allowed to provide, and so forth.

The instance manager 935 may use the trust framework 905 together with the subset of rules previously selected to create an instance of the trust framework. In creating the instance, the instance manager 935 "wires" together components that will enforce the rules of the instance. The instance manager 935 determines where components will be hosted, instantiates such components, may select protocols for the claims providers and other components, and may do other actions to prepare the instance to enforce the rules in allowing or denying access to a Web service of a relying party.

Figure 10:
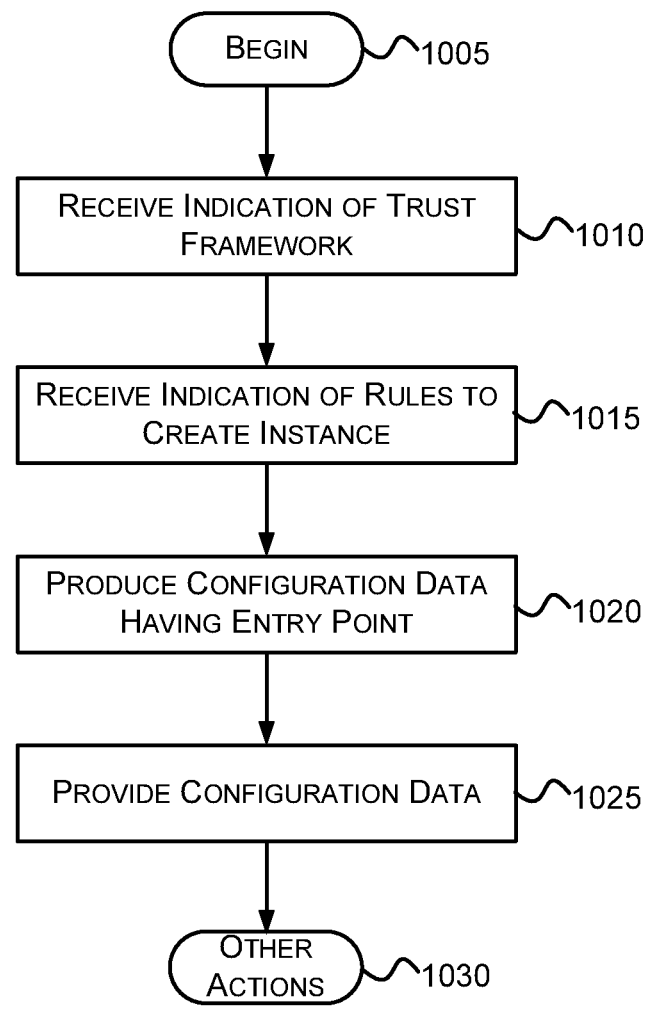
FIG. 10 is a flow diagram that generally represents exemplary actions that may occur in selecting a trust framework and rules for instantiating an instance of a trust framework in accordance with aspects of the subject matter described herein.
Figure 11:
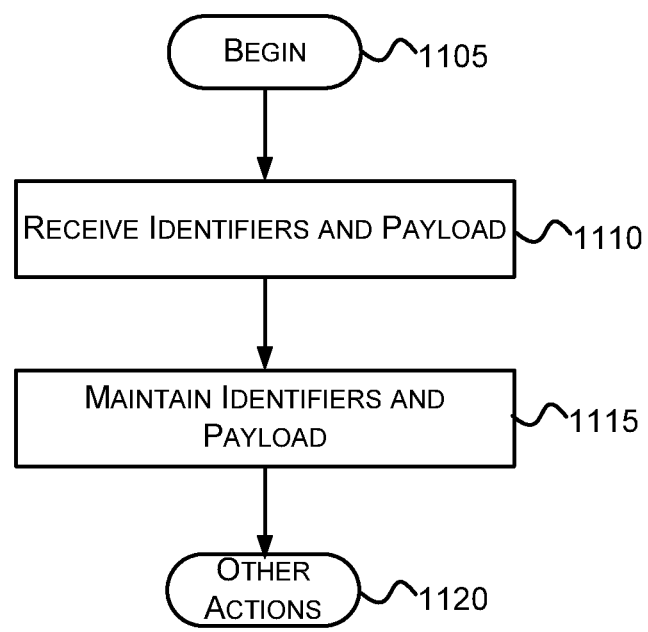
FIG. 11 is a flow diagram that generally represents exemplary actions that may occur in defining and storing a definition of a trust framework in accordance with aspects of the subject matter described herein.

FIGS. 10-11 are flow diagrams that generally represent exemplary actions that may occur in accordance with aspects of the subject matter described herein. For simplicity of explanation, the methodology described in conjunction with FIGS. 10-11 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 10 is a flow diagram that generally represents exemplary actions that may occur in selecting a trust framework and rules for instantiating an instance of a trust framework in accordance with aspects of the subject matter described herein. At block 1005, the actions begin.

At block 1010, an indication of a trust framework is received. For example, referring to FIG. 4, a Web portal may receive an indication of a trust framework via the selection element 405. The Web portal may display a plurality of trust frameworks in a graphical interface element usable to select the trust framework.

At block 1015, an indication of rules to create an instance of the trust framework is received. For example, referring to FIG. 5, an indication of identity providers and claims allowed to be provided by the identity providers is received.

At block 1020, configuration data is produced that indicates an entry point of the instance of the trust framework. For example, referring to FIG. 9, the policy service 805 creates (or obtains from the instance manager 935) a URL that serves as an entry point to an instance of the trust framework previously selected at block 1010 and refined at block 1015.

At block 1025, the configuration data is provided for use by the Web service so that the Web service has sufficient information to invoke the instance of the trust framework to grant or deny access to the Web service. For example, referring to FIG. 6 the policy URL is displayed in the element 605 for use in inserting into a page of a Web service to invoke the instance of the trust framework. Inserting the URL into the page may cause the Web service to redirect requests for access to the Web service to the instance of the trust framework which may then use identity information to grant or deny access to the Web service. The configuration data may be provided to a relying party relies on the instance of the trust framework to grant or deny access to the Web service.

At block 1030, other actions, if any, may be performed. For example, trust frameworks may be defined by:

1. Receiving rules of the trust frameworks;
2. Representing the rules by structured computer data (which may include code); and
3. Writing the structured computer data to a data store.

As another example, available claims providers may be displayed in a graphical interface such as the window 500 of FIG. 5. After displaying the claims providers, the Web portal may receive an indication of one or more claims providers that are allowed to provide a claim via the instance of the trust framework. The Web portal may also display one or more claims for each claims provider and allow a user to select which claims each claims provider is allowed to provide.

As another example, summary data about the instance of the trust framework may be displayed as illustrated in FIG. 6.

FIG. 11 is a flow diagram that generally represents exemplary actions that may occur in defining and storing a definition of a trust framework in accordance with aspects of the subject matter described herein. At block 1105, the actions begin.

At block 1110, a definition of a trust framework is received. The definition includes rules derived from a set of legal, operational, and technical requirements for exchanging identity information. The definition indicates one or more claims providers and further indicates claims that the claims providers may provide. For example, referring to FIG. 9, the policy service 805 may receive rules of the trust framework 905 from an administrator. In response the policy service 805 may store structured computer data that represents the rules in a store that store the definition of the trust framework 905.

At block 1115, other actions, if any, may be performed. For example, a mapping from claims of a claims provider to a normalized claim set may be received and stored as part of the trust framework definition.

As another example, an indication of a consent experience for a claims provider may be received and stored together with an association to the claims provider as part of the definition.

As another example, configuration parameters of a credentialing system to use for the trust framework may be received and stored as part of the definition.

As another example, identifiers of locations of components of the trust framework may be received as stored as part of the definition.

The examples above are not intended to be all-inclusive or exhaustive. Indeed, based on the teachings herein, those skilled in the art may recognize other actions that may be performed without departing from the spirit or scope of aspects of the subject matter described herein.

As can be seen from the foregoing detailed description, aspects have been described related to facilitating claim use in an identity framework. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    defining a policy Uniform Resource Locator that identifies a policy of a relying party by:
        displaying, via a Web portal, a plurality of trust frameworks in a first graphical user interface usable to select a trust framework from the plurality of trust frameworks;
        at the Web portal, via the first graphical user interface receiving an indication of the trust framework selected from the plurality of trust frameworks, the trust framework having rules derived from a set of requirements for exchanging identity information including providing of a privacy boundary to control transmission of identity information, the privacy boundary preventing identity information sufficient to identify a natural identity of a user from passing from a user agent to a Web service without user consent;
        at the Web Portal, receiving from a user an indication of a subset of the rules of the selected trust framework to use to create an instance of the trust framework, the instance of the trust framework allowing or denying access to the Web service based on the subset of the rules;
        displaying, via the Web portal, a plurality of claims providers in a second graphical user interface;
        receiving at the Web portal via the second graphical user interface an indication of a claims provider that is allowed to provide a claim via the instance of the trust framework;
        producing configuration data that indicates an entry point of the instance of the trust framework; and
        providing at least a portion of the configuration data for use by the Web service so that the Web service has sufficient information to invoke the instance of the trust framework to grant or deny access to the Web service.

2. The method of claim 1, further comprising:
    via a third graphical interface, receiving the rules of the trust framework;
    representing the rules by structured computer data; and
    writing the structured computer data to a data store.

3. The method of claim 1, wherein providing at least a portion of the configuration data for use by the Web service comprises providing the policy uniform resource locator (URL) that indicates the entry point of the instance of the trust framework.

4. The method of claim 3, further comprising inserting the policy URL into a Web page of the Web service to cause the Web service to redirect requests for access to the Web service to the instance of the trust framework.

5. The method of claim 1, wherein providing at least a portion of the configuration data comprises providing the at least a portion of the configuration data to the relying party that relies on the instance of the trust framework to grant or deny access to the Web service.

6. The method of claim 1, further comprising displaying a plurality of claims that includes the claim and receiving an indication of the claim via the Web portal.

7. The method of claim 1, further comprising displaying summary data that includes services URLs of the instance of the trust framework, data about the relying party, and data about required claims.

8. The method of claim 1, further comprising receiving a name of the relying party and a home realm of the relying party, wherein the home realm is a home of the Web service to which access is to be controlled.

9. A computer storage memory having computer-executable instructions, which when executed perform actions, comprising:
    defining a policy Uniform Resource Locator that identifies a policy of a relying party by:
        receiving via a graphical user interface at a Web portal a definition of a trust framework, the definition including rules derived from a set of requirements for exchanging identity information including providing of a privacy boundary to control transmission of identity information, the privacy boundary preventing identity information sufficient to identify a natural identity of a user from passing from a user agent to a relying party without user consent, the definition indicating one or more claims providers, the definition further indicating claims that the claims providers may provide; and
        storing the definition in a store for subsequent use in creating an instance of the trust framework that operates using a subset of the rules.

10. The computer storage memory of claim 9, further comprising receiving a mapping from the claims to a normalized claim set and storing the mapping as part of the definition.

11. The computer storage memory of claim 9, further comprising receiving an indication of a consent experience for a claims provider and storing the indication and an association with the claims provider as part of the definition.

12. The computer storage memory of claim 9, further comprising receiving configuration parameters of a credentialing system to use for the trust framework and storing the configuration parameters as part of the definition.

13. The computer storage memory of claim 9, further comprising receiving identifiers of locations of components of the trust framework and storing the identifiers as part of the definition.

14. In a computing environment, a system, comprising:
    a store operable to store definition of trust frameworks, each trust framework having rules derived from a set of requirements for exchanging identity information including providing of a privacy boundary to control transmission of identity information, the privacy boundary preventing identity information sufficient to identify a natural identity of a user from passing from a user agent to a Web service without user consent, the rules indicating allowable locations for services of instances of the trust framework;
    a policy service operable to define a policy Uniform Resource Locator that identifies a policy of a relying party, the policy service further operable to receive via a graphical user interface an indication of a trust framework and a subset of rules of the trust framework to use to create an instance of trust framework for allowing or denying access to the Web service based on the subset of the rules, the policy service further operable to provide configuration data that indicates an entry point of the instance of the trust framework by which the instance of the trust framework is invoked; and an instance manager operable to instantiate the instance of the trust framework to grant or deny access to the Web service based on identity information.

15. The system of claim 14, wherein the policy service is operable to receive an indication of a trust framework via a Web portal.

16. The system of claim 14, wherein the policy service is operable to receive the subset of rules via a Web portal.

17. The system of claim 16, wherein the subset of rules indicates claims providers that are allowed to provide claims.

18. The system of claim 17, wherein the subset of rules indicates which claims each of the claims providers are allowed to provide.

* * * * *